G. L. JACQUES.
FRICTION GEARING.
APPLICATION FILED APR. 16, 1919.

1,319,087.

Patented Oct. 21, 1919.
2 SHEETS—SHEET 2.

Witnesses.

Inventor.
George L. Jacques,
By Munn &Co.
Attorneys.

UNITED STATES PATENT OFFICE.

GEORGE L. JACQUES, OF NEILLSVILLE, WISCONSIN.

FRICTION-GEARING.

1,319,087. Specification of Letters Patent. Patented Oct. 21, 1919.

Application filed April 16, 1919. Serial No. 290,430.

*To all whom it may concern:*

Be it known that I, GEORGE L. JACQUES, a citizen of the United States, and a resident of Neillsville, in the county of Clark and State of Wisconsin, have invented certain new and useful Improvements in Friction-Gearings, of which the following is a specification.

My present invention relates generally to friction gearing, and more particularly to friction driving connections for automobiles and other motor cars, my primary object being the provision of a construction wherein the driving friction member may be the softer of the two friction members, whereby to obviate flat surfaces which cause pounding.

A further object is the provision of a construction whereby the speed may be changed gradually without disengaging the friction members.

A still further object is the provision of a construction by which the direction of motion of the driven member may be quickly and readily reversed.

These and other objects, as well as the advantages of my invention, will be better understood by reference to the following description, in connection with the accompanying drawings, which latter form a part of this specification and embody several figures, of which:

Referring now to these figures, the numerals 4 and 5 indicate portions of the side bars of a chassis as applied to an automobile, which are held in a parallel position by the pivot yoke 8 and the cross bars 28 and 29.

Figure 1:
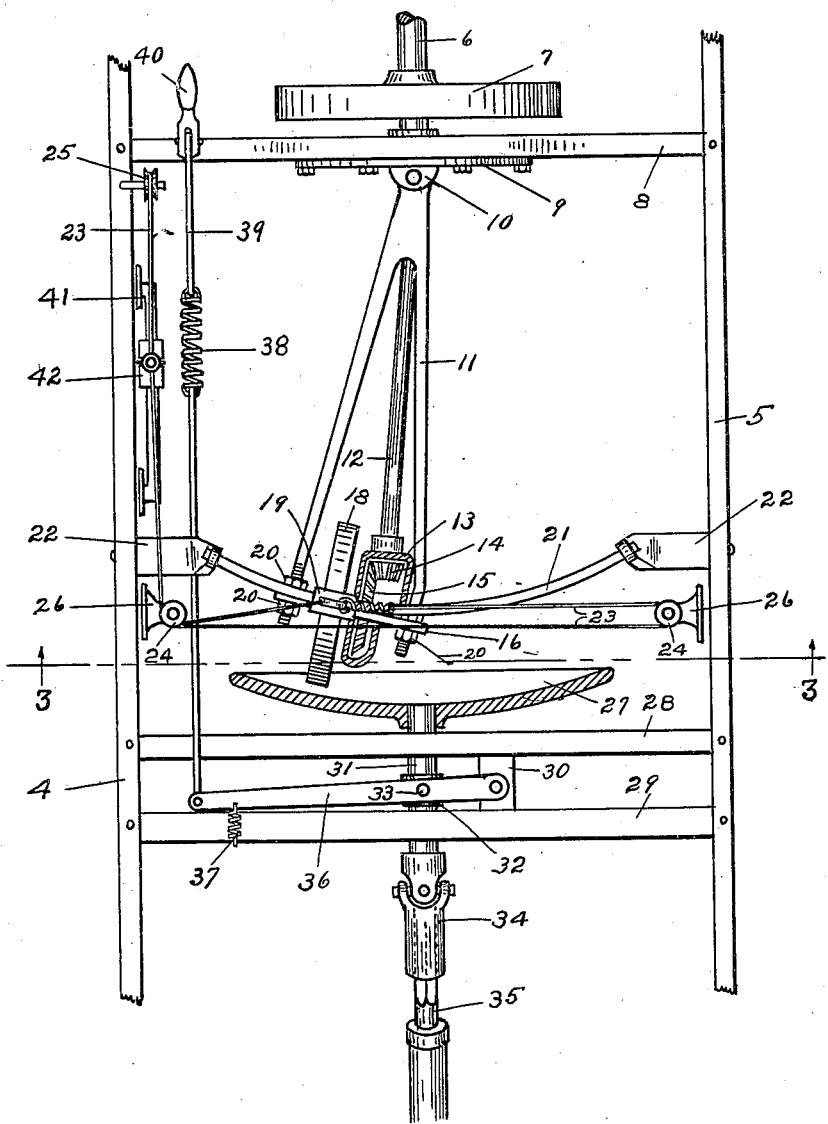
Figure 1 is a top plan view of my improvements.
Figure 2:
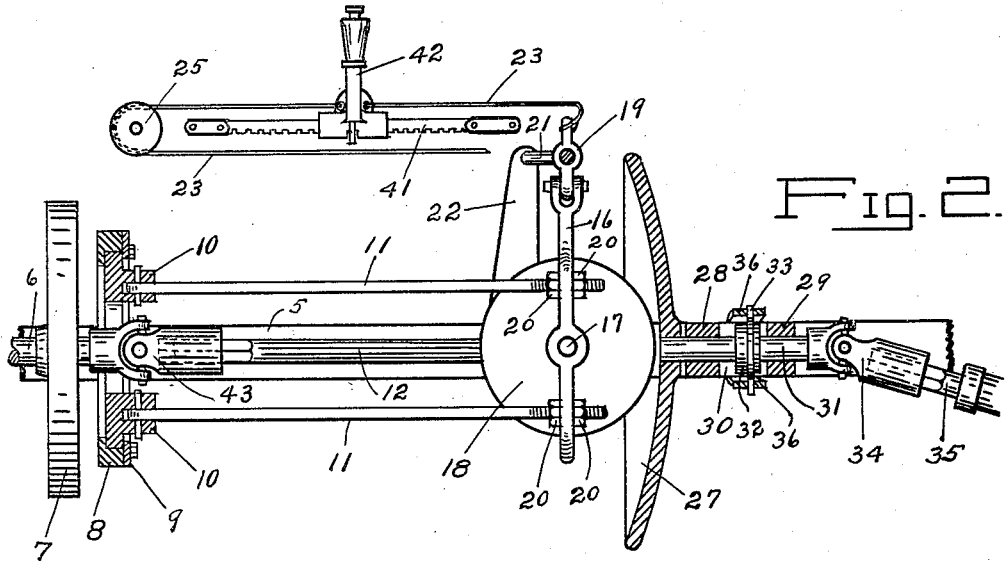
Fig. 2 is a sectional side view of a portion thereof.
Figure 3:
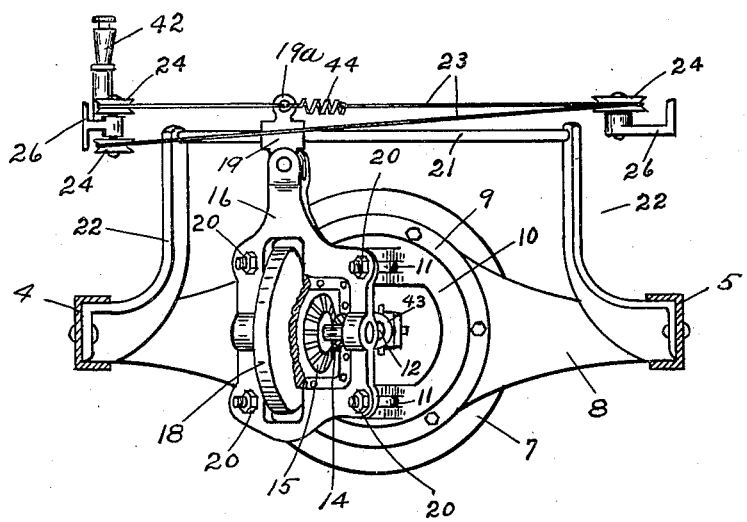
Fig. 3 is a transverse section taken substantially on line 3—3 of Fig. 1.

The pivot collar 10 (see Figs. 2 and 3) is rotatably fitted centrally into the pivot yoke 8 and is held in place by a ring 9 which is fastened to the pivot yoke. A pair of upper and lower brackets 11 are pivoted at their forward ends to the pivot collar 10 and extend rearwardly to the friction wheel cage 16 where the forward ends of said arms 11 are adjustly secured through said friction wheel cage 16 by the nuts 20 so as to provide for adjustment of contact between the friction wheel 18 and the driven friction disk as presently described.

The friction wheel 18 is rigidly mounted on a shaft 17 which is journaled through the friction wheel cage 16 and provided with a bevel gear 15 in mesh with a bevel gear pinion 14 which is carried on the extreme rear end of propeller shaft 12. This shaft 12 is journaled through the gear case (or oil reservoir) 13 then extends forward between the upper and lower brackets 11 and is connected to the motor shaft 6, shown provided with a fly-wheel 7 by a universal joint and sliding sleeve 43.

The friction wheel cage 16 is supported and carried by a lead block 19 which is pivoted to the friction wheel cage 16 and has an upper eye 19$^a$. This lead block is slidably mounted on an arcuate slide bar 21 secured at its ends to the brackets 22 fastened to the side bars 4 and 5.

A cable 23 is fastened to the eye 19$^a$ of lead block 19 and is provided with a tension coil spring 44 to keep the same taut, said cable being supported by sheaves 24 which are fastened to the inner sides of the vehicle body (not shown) by means of the brackets 26. The cable 23 also extends forwardly along side the body of the vehicle and passes over a sheave 25, and is fastened to a hand lever 42 slidably mounted on a supporting bar 41 also secured to the side of the body. The lever 42 may be provided with any suitable means for locking and holding in any desired place.

The concave friction disk 27 is rigidly mounted on the extreme end of a shaft 31 which is journaled through the cross bars 28 and 29 and is then coupled to the drive shaft 35 by a sliding sleeve and universal joint 34. A grooved collar 32 is rigidly mounted on said shaft 31 between the cross bars 28 and 29 in the groove of which is a ring 33 pivoted to the yoke arm 36. This arm 36 is pivoted at one end to block 30 and has its opposite end pivoted to one end of a connecting rod 39 which extends forward to the foot pedal 40 to which its opposite end is pivoted. This connecting rod is provided with a tension spring 38 to take up any uneven wear in the friction driving members so as to maintain the same pressure of contact between the friction members at all times. The yoke arm 36 is also engaged by a spring 37 which is fastened to the cross bar 29 so that when the foot pedal 40 is released the spring 37 will pull the arm 36 back and disengage the driven friction disk 27 from the friction wheel 18.

In operation, when the motor is set in motion the foot pedal 40 is pushed forward bringing the concave friction disk 27 into contact with the friction wheel 18 and when the friction wheel is at the outer edge of the driven disk 27 the vehicle is then in its low speed. To increase the speed the operator pulls the lever 42 back toward him so that the cable 23 pulls the lead block 19 toward the right, tilting the friction wheel cage 16 when it will immediately climb to the right by the force of its own power. Thus the speed may be increased until its highest speed is reached without disengaging the contact between the friction wheel 18 and the friction disk 27. To reverse, the lever 42 is again pulled back toward the driver so as to pull the lead block 19 past the center of the concave driven disk 27 when the friction wheel 18 will again climb toward the right and past the center of the concave disk thereby reversing its direction of travel.

To bring the vehicle again into a forward travel the operator pushes the lever 42 forward when the cable will pull the lead block to the left tilting the friction wheel cage 16 to the left far enough to bring it past the center of the driven disk when the friction wheel 18 will again by the force of its own power climb to the left until it is again directly under the lead block 19. The direction of travel of the disk is then altered and the vehicle is again moving in forward direction.

I claim:—

1. A friction gearing including a pivoted swinging propeller shaft, supporting arms, a rotatable member mounted around the pivot of the propeller shaft, and to which the said supporting arms are pivoted in line with the pivot of the propeller shaft, a friction drive wheel with which the propeller shaft has a geared connection, a cage supporting the said drive wheel and connected to the said supporting arms, an arcuate slide rod above the said cage, a slide movable on said rod and to which the upper portion of the cage is pivoted, a friction disk engaged by the said friction wheel, and connections for adjusting and moving the said slide on the slide rod.

2. A friction gearing including a pivoted swinging propeller shaft, a friction drive wheel, a friction disk for engagement by the drive wheel, gears connecting the said drive wheel and the propeller shaft, a cage in which the drive wheel and the said gears are mounted, means for shifting said cage, supporting arms for the cage, and a rotatable member to which the arms are pivoted in line with the pivot of the propeller shaft, said supporting arms being adjustably connected to the cage, for the purpose described.

3. A friction gearing including a circular friction drive wheel, a concave friction disk the concave face of which is engaged by the said drive wheel, a cage supporting the drive wheel, an arcuate slide rod above the cage, a slide on the slide rod, to which the said cage is pivoted, means for adjusting the said slide on the slide rod, supporting arms having an adjustable connection at one end with the said cage to shift the drive wheel toward and away from the friction disk, and a rotatable member to which the said supporting arms are pivoted whereby to permit a relative movement of the cage with respect to the said slide.

GEORGE L. JACQUES.

Copies of this patent may be obtained for five cents each, by addressing the "Commissioner of Patents, Washington, D. C."